US010765253B2

(12) United States Patent
Scarsella et al.

(10) Patent No.: US 10,765,253 B2
(45) Date of Patent: Sep. 8, 2020

(54) BREW BASKET FOR AUTOMATED BEVERAGE BREWING APPARATUS

(71) Applicant: SharkNinja Operating LLC, Newton, MA (US)

(72) Inventors: Edward John Scarsella, Brighton, MA (US); William Langr Close, Gloversville, NY (US); Joshua David Anthony, Billerica, MA (US); Justin Garrett Riley, Medway, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 315 days.

(21) Appl. No.: 15/636,874

(22) Filed: Jun. 29, 2017

(65) Prior Publication Data

US 2018/0000279 A1    Jan. 4, 2018

Related U.S. Application Data

(60) Provisional application No. 62/357,447, filed on Jul. 1, 2016.

(51) Int. Cl.
*A47J 31/06* (2006.01)
*A47J 31/10* (2006.01)
(Continued)

(52) U.S. Cl.
CPC .............. *A47J 31/103* (2013.01); *A23F 5/46* (2013.01); *A47J 31/002* (2013.01); *A47J 31/0605* (2013.01); *A47J 31/4403* (2013.01)

(58) Field of Classification Search
CPC . A47J 31/0605; A47J 31/0615; A47J 31/4403
See application file for complete search history.

(56) References Cited

U.S. PATENT DOCUMENTS 2,263,610 A * 11/1941 Cain ..................... A47J 31/002
426/432
4,162,054 A * 7/1979 Hauslein ............. A47J 31/0605
248/94
(Continued)

FOREIGN PATENT DOCUMENTS

| DE | 7525176 U | 4/1976 |
| EP | 0115556 A1 | 8/1984 |
| WO | 9965373 A1 | 12/1999 |

OTHER PUBLICATIONS

PCT International Preliminary Report on Patentability; International Application No. PCT/US2017/039872; International Filing Date Jun. 29, 2017; dated Jan. 1, 2019; pp. 1-7.
(Continued)

*Primary Examiner* — Dana Ross
*Assistant Examiner* — Lawrence H Samuels
(74) *Attorney, Agent, or Firm* — Cantor Colburn LLP

(57) ABSTRACT

A siphon for use in a brew basket includes a first portion formed from a first material and a second portion formed from a second material. The first portion has a first passageway and an outlet. The first passageway is fluidly coupled to said outlet. The second portion has a second passageway and is removably coupled to the first portion. The first passageway and said second passageway form a flow path extending from an interior of the brew basket to the outlet.

9 Claims, 5 Drawing Sheets

(51) Int. Cl.
  *A23F 5/46* (2006.01)
  *A47J 31/00* (2006.01)
  *A47J 31/44* (2006.01)

(56) References Cited

U.S. PATENT DOCUMENTS

| | | | | |
|---|---|---|---|---|
| 4,256,585 | A | * | 3/1981 | Greutert ............... A47J 31/0605 210/474 |
| 5,927,179 | A | * | 7/1999 | Mordini .................. A47J 31/08 99/304 |
| 6,550,370 | B2 | * | 4/2003 | Dam .................... A47J 31/0573 99/280 |
| 2002/0083844 | A1 | * | 7/2002 | Dam .................... A47J 31/0573 99/307 |
| 2005/0204925 | A1 | * | 9/2005 | Orrico ................. A47J 31/0689 99/275 |
| 2012/0186458 | A1 | * | 7/2012 | Helvey .................. A47J 31/06 99/306 |
| 2016/0296057 | A1 | * | 10/2016 | Kim ...................... A47J 31/005 |

OTHER PUBLICATIONS

PCT ISR Written Opinion; International Application No. PCT/US2017/039872; International Filing Date: Jun. 29, 2017; dated Sep. 20, 2017; pp. 1-8.

PCT Notification of Transmittal of the International Search Report; International Application No. PCT/US2017/039872; International Filing Date: Jun. 29, 2017; dated Sep. 20, 2017; pp. 1-6.

* cited by examiner

BREW BASKET FOR AUTOMATED BEVERAGE BREWING APPARATUS

CROSS-REFERENCE TO RELATED APPLICATION

This application claims the benefit of 62/357,447 filed Jul. 1, 2016, which is incorporated herein by reference in its entirety.

BACKGROUND

Exemplary embodiments of the present disclosure relate to a system and method for brewing beverages, and more particularly to a system and method of automatically brewing a beverage having a desired flavor profile.

Various systems and methods for brewing a beverage, such as coffee, are known. Known systems include drip brewing systems in which hot water is filtered through coffee grounds and into a carafe and French press systems in which coffee grounds and hot water are mixed in a container and a water permeable plunger is pressed into the container from above to trap the ground coffee at the bottom of the container.

SUMMARY

According to one embodiment, a siphon for use in a brew basket includes a first portion formed from a first material and a second portion formed from a second material. The first portion has a first passageway and an outlet. The first passageway is fluidly coupled to said outlet. The second portion has a second passageway and is removably coupled to the first portion. The first passageway and said second passageway form a flow path extending from an interior of the brew basket to the outlet.

In addition to one or more of the features described above, or as an alternative, in further embodiments said second portion includes an inlet portion and an outlet portion connected by a bend.

In addition to one or more of the features described above, or as an alternative, in further embodiments said inlet portion is arranged at an angle to said outlet portion.

In addition to one or more of the features described above, or as an alternative, in further embodiments said angle is between about 15° and 75°.

In addition to one or more of the features described above, or as an alternative, in further embodiments said first portion is integrally formed with said brew basket.

In addition to one or more of the features described above, or as an alternative, in further embodiments said first passageway extends generally vertically.

In addition to one or more of the features described above, or as an alternative, in further embodiments said second portion is in an overlapping arrangement with said first portion.

In addition to one or more of the features described above, or as an alternative, in further embodiments said second portion is removably coupled to an end of said first portion, opposite said outlet.

In addition to one or more of the features described above, or as an alternative, in further embodiments one of said first material and said second material is a rigid material, and the other of said first material and said second material is a flexible material.

In addition to one or more of the features described above, or as an alternative, in further embodiments said first portion is formed from a silicone material.

A method of forming a siphon in a brew basket includes forming a first portion of the siphon from a first material. The first portion is associated with a sidewall of the brew basket and has a first passageway and an outlet. The first passageway is fluidly coupled to said outlet. A second portion of the siphon is coupled to the first portion. The second portion is formed from a second material and has a second passageway. When the second portion is coupled to the first portion, the first passageway and the second passageway form a flow path extending from an interior of the brew basket to the outlet.

In addition to one or more of the features described above, or as an alternative, in further embodiments said forming said first portion includes integrally forming said first portion with said sidewall.

In addition to one or more of the features described above, or as an alternative, in further embodiments coupling said second portion to said first portion includes arranging an end of said second portion in overlapping arrangement with an adjacent end of said first portion.

In addition to one or more of the features described above, or as an alternative, in further embodiments said second portion is coupled to said end of said first portion disposed opposite said outlet.

In addition to one or more of the features described above, or as an alternative, in further embodiments one of said first material and said second material is a rigid material, and the other of said first material and said second material is a flexible material.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Aspects and embodiments disclosed herein include a system and method for preparing various brewed beverages. Although the disclosure is described herein with reference to preparing a brewed coffee beverage, preparation of other brewed beverages is within the scope of the disclosure. As the term is used herein, "coffee" refers to a beverage including solids extracted from coffee beans and dissolved in water. Brewed coffee is typically prepared by passing hot water through dried and ground coffee beans, referred to herein as "ground coffee." Solids from the ground coffee are dissolved in the hot water as it passes there through.

Figure 1:
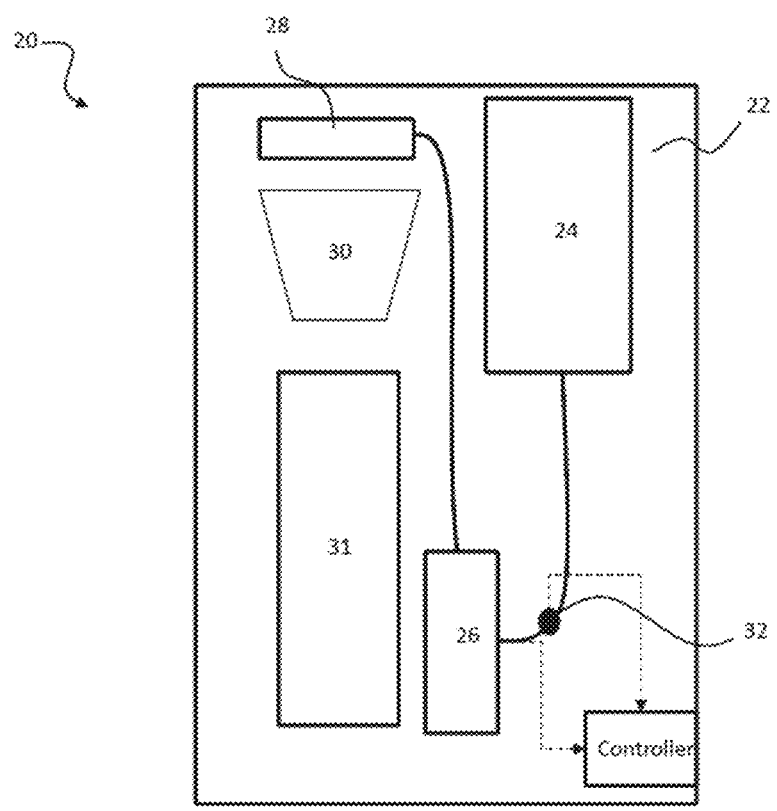
FIG. 1 is a schematic diagram of a beverage brewing apparatus according to an embodiment.

Referring now to FIG. 1, a schematic diagram of an example of a basic automatic beverage brewing system 20, such as a coffee maker for example, is illustrated in more detail. The apparatus includes a housing 22, a reservoir 24, a heating mechanism 26, a shower head 28, and a brew basket 30. The reservoir 24, heating mechanism 26, showerhead 28, and brew basket 30 are arranged sequentially in fluid communication. Upon activation of the system 20, water or another fluid stored within the reservoir 24, is provided to a heating mechanism 26. After being heated to a desired temperature, the water is provided to the shower head 28. The shower head 28 is aligned with and disposed vertically above the brew basket assembly 30. The water is configured to flow through one or more holes formed in the shower head 28 onto coffee grounds or another flavorant contained within the brew basket assembly 30. The fluid containing a portion of the flavorant, is provided to a container 31 via an outlet formed near the bottom of the brew basket 30.

As illustrated in FIG. 1, a flow meter 32 may be arranged within a conduit extending between the water reservoir 24 and the heating mechanism 26. As shown, the water reservoir 24 may be vertically aligned with the flow meter 32 such that water is fed to the system 20, and more specifically to the flow meter 32, by gravity. The flow meter 32 is configured to monitor an amount of water passing there through, which is generally indicative of the amount of water provided to the shower head 28. Various types of flow meters are within the scope of the disclosure. For example, the flow meter 32 may be a rotatable paddle wheel where each rotation generates a signal indicating that a known amount of water has passed through the flow meter 32. It should be understood that the beverage brewing system 20 illustrated and described herein is intended as an example only, and any other apparatus for preparing a brewed beverage, for example an apparatus including a pump for moving water there through, is within the scope of the disclosure.

Figure 2:
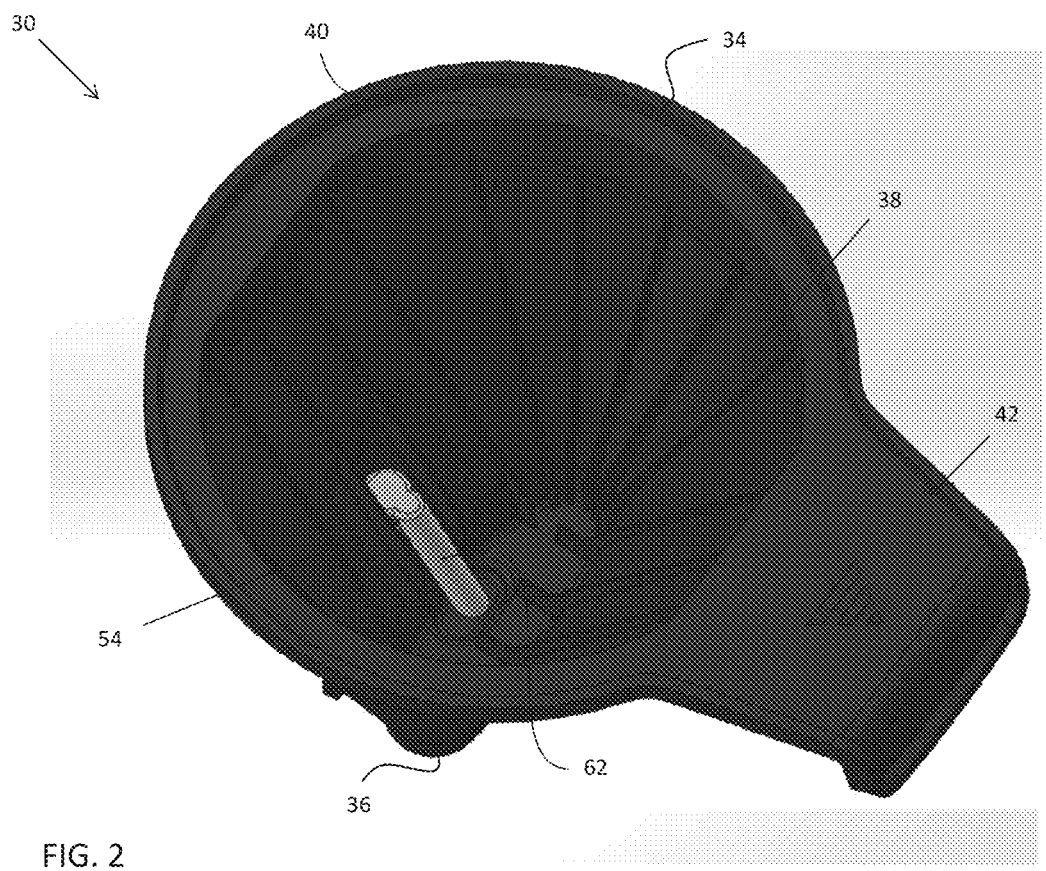
FIG. 2 is a top perspective view of a brew basket assembly according to an embodiment.
Figure 3:
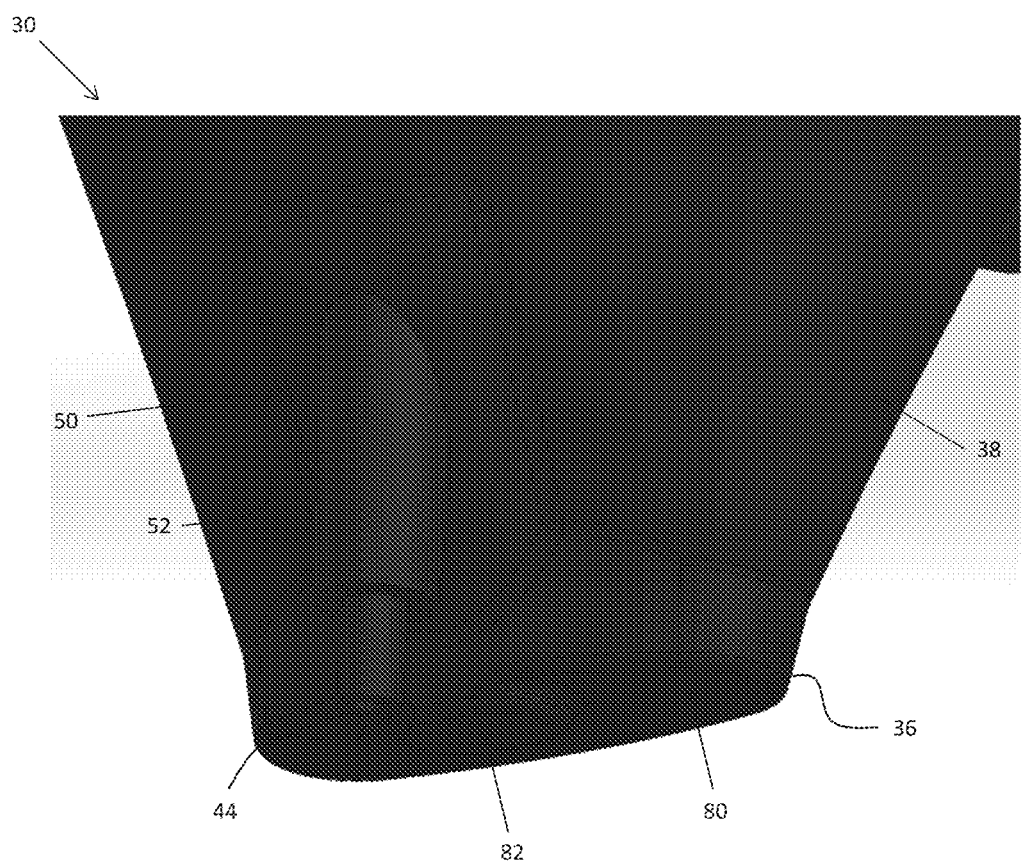
FIG. 3 is a bottom perspective view of the brew basket assembly of FIG. 1 according to an embodiment.
Figure 4:
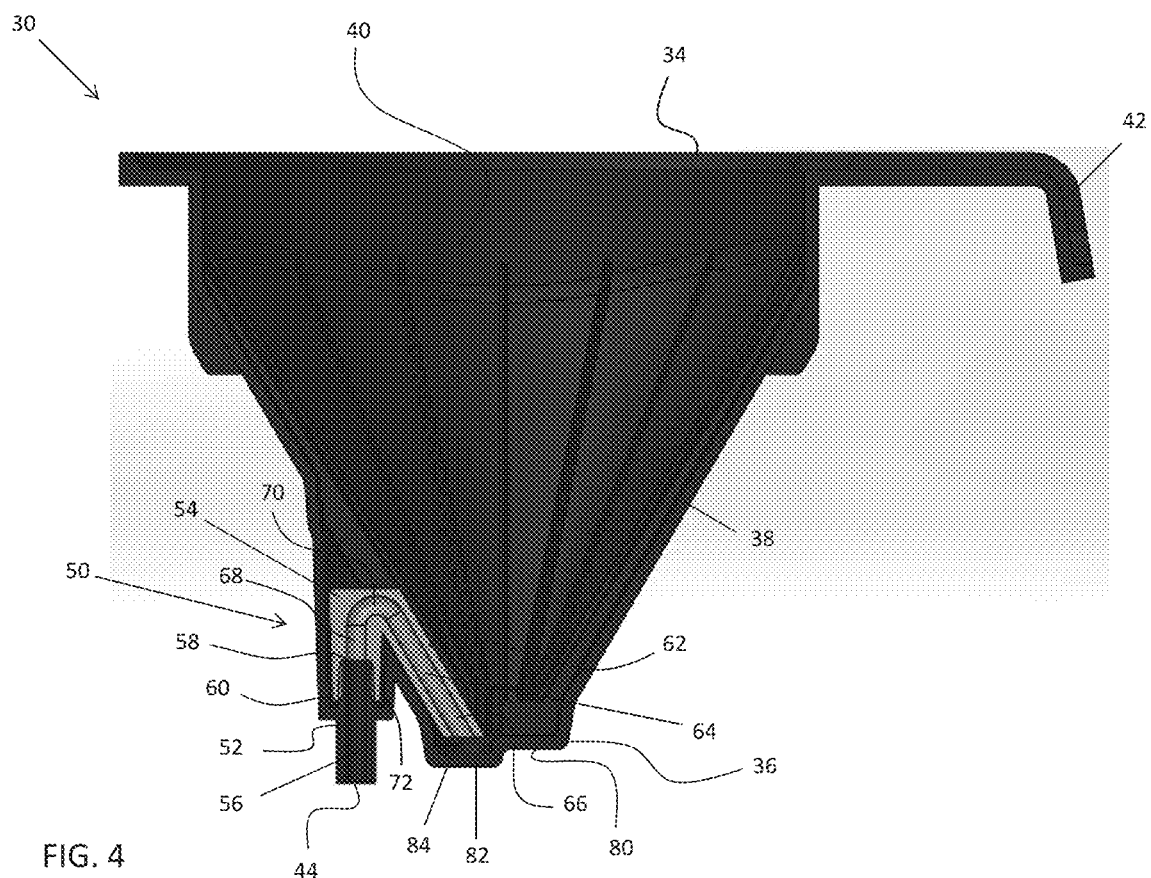
FIG. 4 is a cross-sectional view of the brew basket assembly of FIG. 1 according to an embodiment.
Figure 5:
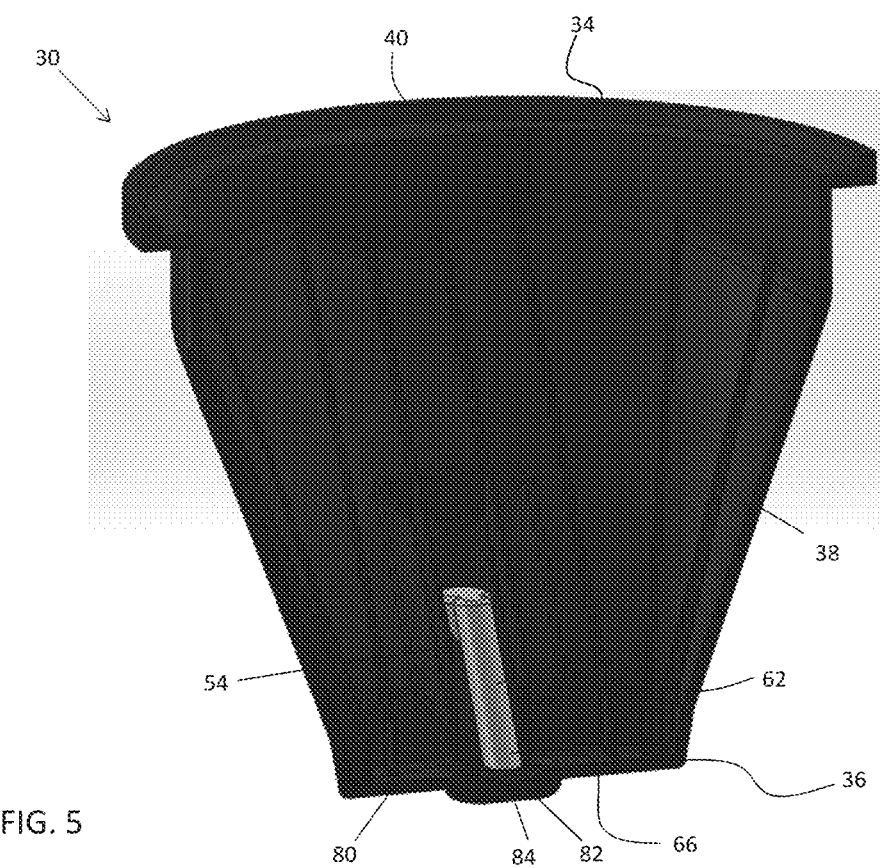
FIG. 5 is another cross-sectional view of the brew basket assembly of FIG. 1 according to an embodiment.

Referring now to FIGS. 2-4, the brew basket 30 is illustrated in more detail. The brew basket 30 includes a first end 34, a second, opposite end 36, and one or more walls 38 extending there between. The walls 38 define an interior volume of space or a chamber 40 within which one or more products associated with the brewing of a beverage are placed. The second end 36 of the brew basket 30 is generally closed or sealed and the first end 34 of the brew basket 30 is open such that products may be inserted into the chamber 40 of the brew basket 30 via the first end 34. The brew chamber 40 may be configured to receive a disposable or permanent coffee filter (not shown) in which ground coffee or espresso may be contained. In the illustrated, non-limiting embodiment, a cross-sectional area of the chamber 40 adjacent the first end 34 is substantially larger than at the second end 36 such that the brew basket 30 is generally conical in shape. A handle 42 may be mounted to or integrally formed with the first end 34 or one of the walls 38 to facilitate transportation and manipulation of the brew basket 30.

The brew basket 30 includes an outlet 44 configured to provide a stream or droplets of fluid to the adjacently located container 31. As shown, the outlet 44 is formed in a portion of a sidewall 38, offset from a center of the brew basket 30. Further, the outlet 44 is disposed vertically below the lowest portion of the chamber 40 holding a fluid.

A siphon 50 is configured to provide a fluid flow path extending from the interior of the chamber 40 to the outlet 44 of the brew basket 30. As shown, the siphon 50 includes two distinct portions: a first portion 52 integrally formed with the brew basket 30, and a second portion 54 removably coupled to the first portion 52. The first portion 52 of the siphon 50 is formed from the rigid plastic material of the brew basket 30 and includes a first passageway 56 connected to the outlet 44. In the illustrated, non-limiting embodiment, the first portion 52, and the first passageway 56 formed therein, extend generally vertically. The vertical configuration of the first portion 52 of the siphon 50 may be arranged within the draw of an injection molding tool for easier manufacturing of the brew basket 30. In an embodiment, the end 58 of the first portion 52, opposite the outlet 44, extends vertically beyond an adjacent horizontal surface 60 to allow for engagement with the second portion 54 of the siphon 50.

The second portion 54 of the siphon 50 includes a resilient tube 62 formed from a soft, flexible, heat-resistant material, such as silicon rubber for example. The resilient tube has a second passageway 64 formed therein. The second passageway 64 may, but need not be the same diameter as the first passageway 56. The second passageway 64 has a smooth interior surface free of sharp corners and transitions. As shown, the second passageway 64 includes an inlet portion 66 and an outlet portion 68 connected by a bend or radius 70.

When the first and second portions 52, 54 are coupled, the outlet portion 68 of the second passageway 64 is substantially aligned with the first passageway 56 and the outlet 40 of the brew basket 30. The end 72 of the resilient tube 62, adjacent the outlet portion 68, is configured to couple to the end 58 of the first portion 52 of the siphon 50 such that together the first and second passageways 56, 64 form a continuous flow path extending between the interior of the chamber 40 and the outlet 44. Although the end 72 of the resilient tube 62 is illustrated as being received about the exterior of end 58 of the first portion 52, other configurations of the connection between the first and second portions 52, 54, such as where the end 58 of the first portion 52 overlaps the exterior of the end 72 of the resilient tube 62 for example, are also contemplated herein.

In the illustrated, non-limiting embodiment, the inlet portion 66 is arranged substantially parallel to the sidewall 38, and the outlet portion 68 is arranged generally vertically such that the outlet portion 68 is oriented at an angle to the sidewall 68. The angle formed between the inlet portion 66 and the outlet portion 68 is between 0° and 90°, and more specifically between about 150 and 75°. However, it should be understood that other configurations of the siphon 50 are also within the scope of the disclosure. Further, although a brew basket 30 having a single outlet 40 and siphon 42 are illustrated and described herein, embodiments including a plurality of outlets 40, and one or more siphons 42 arranged in fluid communication with the plurality of outlets 40 are contemplated.

In the illustrated, non-limiting embodiment, the second end 36 of the brew basket 30 includes a first portion 80 arranged at a first horizontal plane and a second portion 82 arranged at a second, horizontal plane, parallel to and vertically offset from the first horizontal plane. As a result, a cavity 84 is defined at the second end 36, adjacent the siphon 42. The end 86 of the resilient tube 62 adjacent the inlet portion 66 is located within the chamber 40 at a position offset from the second end 36 of the brew basket 30 by a small distance. In an embodiment, the free end 86 is positioned adjacent the cavity 84 and is substantially aligned with the first portion 80 of the second end 36.

Operation of the siphon 50 is not dependent on a filter positioned within the chamber 40 to create a sealed wall of the passageway 64. In addition, the flow rate of the fluid provided to the outlet 44 via the siphon 50 may be controlled by adjusting one or more properties of the passageway 56,64, including but not limited to the inner diameter thereof, the length or height of the inlet or outlet portions 66, 68 thereof, or the orientation of the siphon 50 relative to the brew basket 30 for example.

During a brew cycle, when a fluid, such as water is provided to the chamber 40 of the brew basket 30, the fluid or filtrate is configured to flow as a stream through the passageway 64, 56 to the outlet 44 in a siphoned manner until the siphon is broken. By providing a stream rather than a drip, the likelihood of splatter from the container 31 is reduced due to the increased laminar flow. Generally, the siphon is broken when the level of fluid within the chamber 40 falls to a point where air can enter into the passageway 64. When the siphon is broken, the flow of fluid will stop cleanly and efficiently, thereby eliminating the slow or sporadic drips that occur with conventional systems. This allows a user to remove the container 31 within which the fluid was captured immediately after the brew cycle has completed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A siphon for use in a brew basket comprising:
   a first portion formed from a first material, said first portion having a first passageway and an outlet, said first passageway being fluidly coupled to said outlet; and
   a second portion formed from a second material, said second portion having an inlet portion and an outlet portion connected by a bend, said inlet portion defining an inlet of the siphon, said second portion including a tube defining a second passageway and being removably coupled to said first portion such that said first passageway and said second passageway cooperate to form a flow path extending from said inlet arranged in an interior of the brew basket to said outlet.

2. The siphon according to claim 1, wherein said inlet portion is arranged at an angle to said outlet portion.

3. The siphon according to claim 2, wherein said angle is between about 15° and 75°.

4. The siphon according to claim 1, wherein said first portion is integrally formed with said brew basket.

5. The siphon according to claim 1, wherein said first passageway extends generally vertically.

6. The siphon according to claim 1, wherein said second portion is in an overlapping arrangement with said first portion.

7. The siphon according to claim 1, wherein said second portion is removably coupled to an end of said first portion, opposite said outlet.

8. The siphon according to claim 1, wherein one of said first material and said second material is a rigid material and the other of said first material and said second.

9. The siphon according to claim 8, wherein said second portion is formed from a silicone material.

* * * * *